(12) United States Patent
Koseki

(10) Patent No.: US 11,442,078 B2
(45) Date of Patent: Sep. 13, 2022

(54) MOUNTING DIRECTION DETERMINATION DEVICE AND MOUNTING DIRECTION DETERMINATION METHOD OF ACCELERATION SENSOR

(71) Applicant: Daimler AG, Stuttgart (DE)

(72) Inventor: Tetsuro Koseki, Kanagawa (JP)

(73) Assignee: Daimler AG, Stuttgart (DE)

( * ) Notice: Subject to any disclaimer, the term of this patent is extended or adjusted under 35 U.S.C. 154(b) by 9 days.

(21) Appl. No.: 16/767,982

(22) PCT Filed: Sep. 13, 2018

(86) PCT No.: PCT/JP2018/033974
§ 371 (c)(1),
(2) Date: Dec. 8, 2020

(87) PCT Pub. No.: WO2019/106911
PCT Pub. Date: Jun. 6, 2019

(65) Prior Publication Data
US 2021/0109124 A1    Apr. 15, 2021

(30) Foreign Application Priority Data

Nov. 29, 2017   (JP) .............................. JP2017-229016

(51) Int. Cl.
*G01P 15/18*   (2013.01)
*G01P 1/02*    (2006.01)

(52) U.S. Cl.
CPC .............. *G01P 15/18* (2013.01); *G01P 1/023* (2013.01)

(58) Field of Classification Search
CPC ....................................................... G01P 15/18
See application file for complete search history.

(56) References Cited

U.S. PATENT DOCUMENTS 8,892,385 B2 * 11/2014 Van den Bergh ....... G06F 17/00
                                                      702/104
2007/0132637 A1   6/2007 Kolavennu et al.
(Continued)

FOREIGN PATENT DOCUMENTS

CN   101223417 A   7/2008
CN   102782506 A   11/2012
(Continued)

OTHER PUBLICATIONS

PCT/JP2018/033974, International Search Report dated Oct. 9, 2018 (Two (2) Pages).
(Continued)

*Primary Examiner* — Walter L Lindsay, Jr.
*Assistant Examiner* — Andrew V Do
(74) *Attorney, Agent, or Firm* — Crowell & Moring LLP

(57) ABSTRACT

A mounting direction determination device and a mounting direction determination method of an acceleration sensor which can automatically determine the direction of the acceleration sensor mounted on a vehicle. The mounting direction determination device determines a mounting direction, relative to a vehicle, of the acceleration sensor that is capable of detecting a first acceleration in a first direction and a second acceleration in a second direction. A mounting direction determination unit determines the mounting direction by comparing values actually measured by the acceleration sensor with determination reference data. The determination reference data specifies a combination of the detection results of the first acceleration and the second acceleration and the mounting directions.

10 Claims, 3 Drawing Sheets

(56) References Cited

U.S. PATENT DOCUMENTS

2008/0208501 A1    8/2008  Fiedler et al.
2012/0259499 A1   10/2012  Hiraoka
2015/0088455 A1    3/2015  Yamashita

FOREIGN PATENT DOCUMENTS

| CN | 104729454 A | 6/2015 |
|---|---|---|
| CN | 105651253 A | 6/2016 |
| CN | 106226558 A1 | 12/2016 |
| DE | 10 2005 033 237 A1 | 1/2007 |
| JP | 11-190742 A | 7/1999 |
| JP | 2005-274186 A | 10/2005 |
| JP | 2005-300556 A | 10/2005 |
| JP | 2008-8653 A | 1/2008 |
| JP | 2014-95658 A | 5/2014 |
| KR | 10-2008-0025705 A | 3/2008 |
| WO | WO 2007/009825 A1 | 1/2007 |
| WO | WO 2011/111098 A1 | 9/2011 |
| WO | WO 2014/020647 A1 | 2/2014 |

OTHER PUBLICATIONS

Chinese-language Office Action issued in Chinese Application No. 201880073644.X dated Jul. 16, 2021 with partial English translation (14 pages).

Chinese-language Office Action issued in Chinese Application No. 201880073644.X dated Jan. 30, 2022 with English translation (18 pages).

Chinese-language Office Action issued in Chinese Application No. 201880073644.X dated Jun. 1, 2022, with English Translation (19 pages).

\* cited by examiner

FIG. 3

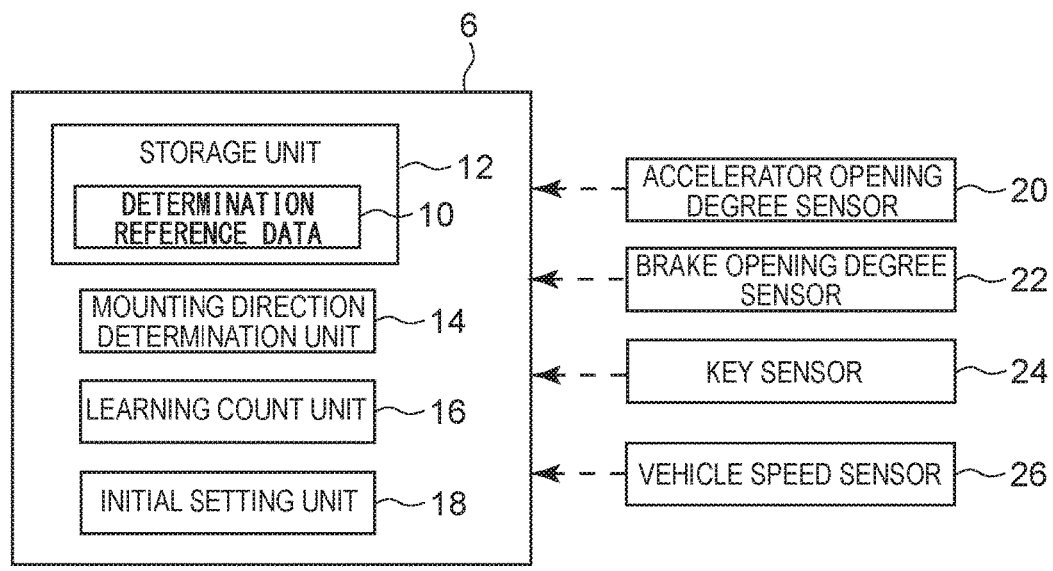

FIG. 4

| | Acceleration | | Deceleration | | Mounting direction |
|---|---|---|---|---|---|
| | ax | ay | ax | ay | |
| Type 1 | Positive | None | Negative | None | First direction X is oriented toward the rear side of the vehicle. |
| Type 2 | Negative | None | Positive | None | First direction X is oriented toward the front side of the vehicle. |
| Type 3 | None | Positive | None | Negative | Second direction Y is oriented toward the rear side of the vehicle. |
| Type 4 | None | Negative | None | Positive | Second direction Y is oriented toward the front side of the vehicle. |

MOUNTING DIRECTION DETERMINATION DEVICE AND MOUNTING DIRECTION DETERMINATION METHOD OF ACCELERATION SENSOR

FIELD OF THE INVENTION

The present invention relates to a mounting direction determination device and a mounting direction determination method of an acceleration sensor for determining a mounting direction of an acceleration sensor mounted on a vehicle.

BACKGROUND OF THE INVENTION

One of input elements for vehicle control is the acceleration of a vehicle. This kind of acceleration is detected by an acceleration sensor, such as a G sensor mounted on a vehicle. A detection value of the acceleration sensor is input to a control unit, such as an electronic control unit (ECU), and used for various vehicle controls, including estimation of the gradient of a travel road surface and the weight of the vehicle.

For example, Japanese Unexamined Patent Application Publication No. 2005-300556 discloses a vehicle in which a G sensor is disposed on an axle of the vehicle, and a detection value of the G sensor is sent to an ECU, mounted on the vehicle and separately from the G sensor, to perform various controls.

SUMMARY OF THE INVENTION

In the technique described in Japanese Unexamined Patent Application Publication No. 2005-300556, the G sensor as the acceleration sensor and the ECU as the control unit are separately mounted on the vehicle. However, in recent years, an integrated ECU where the G sensor is incorporated in the ECU has become the mainstream. Meanwhile, the mounting posture of the ECU on a vehicle varies depending on specifications of the vehicle. In particular, when a vehicle layout has a small margin, the mounting posture of the ECU might also be determined by the layout of its surroundings. Because of this, in the case of using the integrated ECU incorporating the G sensor, the direction of the G sensor would also vary depending on the mounting posture of the ECU. For this reason, the integrated ECU incorporates an acceleration sensor (so-called two-axis sensor) capable of detecting respective accelerations in directions that intersect each other and then recognizes a detection signal of the G sensor in accordance with the mounting posture of the ECU, thereby performing an initial setting for specifying the direction of the G sensor.

Such an initial setting is performed by an operator during manufacture of the vehicle or during replacement of the integrated ECU. Consequently, for example, operation errors, such as an erroneous setting of the direction of the G sensor, could occur. In addition, in a mass production process, such an initial setting operation might become a factor that hinders improvement of the manufacturing efficiency.

At least one embodiment of the present invention has been made in view of the foregoing circumstances. Therefore, it is an object of at least one embodiment of the present invention to provide a mounting direction determination device and a mounting direction determination method of an acceleration sensor which can automatically determine the direction of the acceleration sensor mounted on a vehicle.

(1) To solve the above-mentioned problems, a mounting direction determination device of an acceleration sensor according to at least one embodiment of the present invention is configured to determine a mounting direction of the acceleration sensor with respect to a vehicle, the acceleration sensor being capable of respectively detecting a first acceleration in a first direction and a second acceleration in a second direction that intersects the first direction, the mounting direction determination device including:

a storage unit for storing determination reference data that specifies a combination of detection results of the first acceleration and the second acceleration and a mounting direction of the acceleration sensor on the vehicle; and a mounting direction determination unit for determining a mounting direction of the acceleration sensor with respect to the vehicle by comparing actually measured values of the first acceleration and the second acceleration detected by the acceleration sensor with the determination reference data stored in the storage unit.

With the above-mentioned configuration (1), the first acceleration and the second acceleration, which are to be obtained for each mounting direction of the acceleration sensor, are stored as the determination reference data in the storage unit. The mounting direction determination unit can precisely determine the mounting direction of the acceleration sensor mounted on the vehicle by comparing the actually measured values of the acceleration sensor (the first acceleration in the first direction and the second acceleration in the second direction) with such determination reference data.

(2) In some embodiments with the above-mentioned configuration (1), the acceleration sensor is mounted such that one of the first direction and the second direction is a vehicle front-rear direction, while the other is a vehicle width direction, and the mounting direction determination unit determines the mounting direction of the acceleration sensor with respect to the vehicle when only one of the first acceleration and the second acceleration responds to the acceleration sensor.

With the above-mentioned configuration (2), the mounting direction of the acceleration sensor is determined under the condition in which one of the first acceleration and the second acceleration corresponds to the acceleration in the vehicle front-rear direction and the other corresponds to the acceleration in the vehicle width direction. In this case, as the presence or absence of the responses of the first acceleration and the second acceleration can be clearly judged, the mounting direction can be determined with high accuracy.

(3) In some embodiments with the above-mentioned configuration (1) or (2), the mounting direction determination unit determines a mounting direction of the acceleration sensor with respect to the vehicle during acceleration of the vehicle.

With the above-mentioned configuration (3), the mounting direction of the acceleration sensor can be determined based on the acceleration acting on the acceleration sensor when the vehicle accelerates.

(4) In some embodiments with the above-mentioned configuration (1) or (2), the mounting direction determination unit determines the mounting direction of the acceleration sensor with respect to the vehicle during deceleration of the vehicle.

With the above-mentioned configuration (4), the mounting direction of the acceleration sensor can be determined based on the acceleration acting on the acceleration sensor when the vehicle decelerates.

(5) In some embodiments with any one of the above-mentioned configurations (1) or (4), the mounting direction determination unit determines whether or not the mounting direction determined during acceleration of the vehicle is matched with the mounting direction determined during deceleration of the vehicle.

With the above-mentioned configuration (5), the mounting direction of the acceleration sensor can be determined based on whether the determination results obtained during acceleration and during deceleration of the vehicle are matched with each other. Thus, the mounting direction can be determined with higher accuracy by considering the consistency of the determination results under these different driving situations.

(6) In some embodiments with the above-mentioned configuration (5), the mounting direction determination device further includes an initial setting unit for performing an initial setting of the acceleration sensor based on the mounting direction, determined by the mounting direction determination unit, wherein the initial setting unit performs the initial setting based on the mounting direction when the mounting direction determination unit determines that the mounting direction determined during acceleration of the vehicle is matched with the mounting direction determined during deceleration of the vehicle.

With the above-mentioned configuration (6), when the determination results obtained during acceleration and during deceleration of the vehicle are matched with each other, such matched determination results are judged to be true with high accuracy. Thus, the initial setting is performed based on the determination results which have been judged with high accuracy, so that the vehicle to be controlled can have satisfactory reliability.

(7) In some embodiments with the above-mentioned configuration (5) or (6), the initial setting unit performs the initial setting based on the mounting direction in a case where the number of times when the mounting direction determination unit determines that the mounting direction determined during acceleration of the vehicle is matched with the mounting direction determined during deceleration of the vehicle exceeds a predetermined value.

With the above-mentioned configuration (7), when the number of times when the determination results respectively obtained during acceleration and during deceleration of the vehicle are matched with each other exceeds the predetermined value, such determination results are judged to be true with higher accuracy. Thus, the initial setting unit performs the initial setting based on these determination results which have been judged with high accuracy, so that the vehicle to be controlled can have satisfactory reliability.

(8) In some embodiments with any one of the above-mentioned configurations (1) or (7), the acceleration sensor is incorporated in a control unit mounted on the vehicle.

With the above-mentioned configuration (8), the above-mentioned acceleration sensor is incorporated in the control unit of the vehicle, such as an ECU. Thus, with the above-mentioned configuration, the mounting direction can be appropriately determined, thereby enabling the vehicle control with high accuracy, even when the mounting posture of the integrated ECU that incorporates the acceleration sensor changes.

(9) To solve the above-mentioned problems, a mounting direction determination method of an acceleration sensor according to at least one embodiment of the present invention is provided to determine a mounting direction of an acceleration sensor with respect to the vehicle, the acceleration sensor being capable of respectively detecting a first acceleration in a first direction and a second acceleration in a second direction that intersects the first direction. The method includes the steps of:

previously preparing determination reference data that specifies a combination of detection results of the first acceleration and the second acceleration and a mounting direction of the acceleration sensor on the vehicle;

acquiring actually measured values of the first acceleration and the second acceleration detected by the acceleration sensor; and determining a mounting direction of the acceleration sensor with respect to the vehicle by comparing the actually measured values of the first acceleration and the second acceleration with the determination reference data.

With the above-mentioned method (9), the first acceleration and the second acceleration, which are to be obtained for each mounting direction of the acceleration sensor, are previously stored as the determination reference data. The mounting direction of the acceleration sensor can be precisely determined by comparing the actually measured values of the acceleration sensor (the first acceleration in the first direction and the second acceleration in the second direction) with such determination reference data.

(10) In some embodiments with the above-mentioned method (9), the step of determining the mounting direction includes the steps of:

determining the mounting direction during acceleration of the vehicle;

determining the mounting direction during deceleration of the vehicle; and determining whether the mounting direction determined during acceleration is matched with the mounting direction determined during deceleration.

With the above-mentioned method (10), the mounting direction of the acceleration sensor can be determined based on whether the determination results obtained during acceleration and during deceleration of the vehicle are matched with each other. Thus, the mounting direction can be determined with higher accuracy by considering the consistency of the determination results under these different driving situations.

(11) In some embodiments with the above-mentioned method (10), the mounting direction determination method further includes the step of performing an initial setting of the acceleration sensor based on the mounting direction in a case where the number of times when the mounting direction determined during the acceleration is matched with the mounting direction determined during the deceleration exceeds a predetermined value.

With the above-mentioned method (11), when the number of times when the determination results respectively obtained during acceleration and during deceleration of the vehicle are matched with each other exceeds the predetermined value, such determination results can be judged to be true with higher accuracy. Thus, the initial setting of the acceleration sensor is performed based on the determination results which have been judged with high accuracy, so that the vehicle to be controlled can have satisfactory reliability.

Accordingly, at least one embodiment of the present invention can provide the mounting direction determination device and the mounting direction determination method of the acceleration sensor which can automatically determine the direction of the acceleration sensor mounted on a vehicle.

BRIEF DESCRIPTION OF THE DRAWINGS

FIG. 3 is a block diagram functionally showing an internal configuration of the ECU shown in FIG. 1.

FIG. 4 shows an example of the determination reference data stored in a storage unit shown in FIG. 3.

DESCRIPTION OF THE EMBODIMENTS

Some embodiments of the present invention will be described below with reference to the accompanying drawings. It is noted that the dimensions, materials, shapes, relative arrangements, and the like of components described in the embodiments or shown in the figures are not intended to limit the scope of the present invention thereto and are illustrative examples only.

For example, expressions representing the relative or absolute arrangements, such as "in a direction", "along a direction", "parallel", "perpendicular", "center", "concentric", and "coaxial", indicate not only such positions strictly, but also the conditions that are relatively displaced by the tolerance or by an angle or distance that achieves the same function.

Furthermore, for example, expressions representing the shape, such as a quadrilateral shape and a cylindrical shape, indicate not only the quadrilateral and cylindrical shapes strictly in terms of geometry, but also the shapes in which an uneven part, a chamfered part, and the like are included, as long as they exhibit the same effect.

Meanwhile, expressions of "comprising", "including", "provided with", "containing" and "having" one component are not exclusive expressions that exclude the existence of other components.

Figure 1:
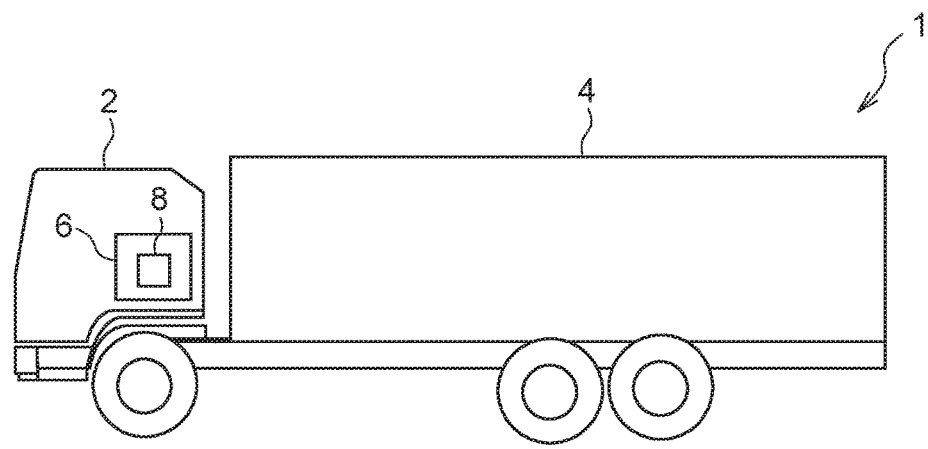
FIG. 1 is a schematic diagram showing a vehicle on which a mounting direction determination device of an acceleration sensor according to an embodiment of the present invention is mounted.

FIG. 1 is a schematic diagram showing a vehicle on which a mounting direction determination device of an acceleration sensor according to an embodiment of the present invention is mounted. The vehicle 1 is a vehicle where at least one of an engine and an electric motor is mounted as a driving power source. In the present embodiment, a vehicle 1 is a truck vehicle that includes a cab 2 disposed at the front side thereof and a deck 4 disposed at the rear side of the cab 2.

Note that although a truck vehicle is exemplified as the vehicle 1 in the present embodiment, any other vehicle may be used.

The vehicle 1 includes an ECU 6 that performs various controls of the vehicle 1. The ECU 6 is configured of an electronic arithmetic unit, and functions as a control unit for performing various controls of the vehicle 1 by installing predetermined programs in advance.

The ECU 6 is an integrated ECU that incorporates therein an acceleration sensor (G sensor) 8 for detecting an acceleration of the vehicle 1, which is one of input elements for vehicle control. A detection result of the acceleration sensor 8 is input as an electric signal to the ECU 6 and used for various vehicle controls, such as estimation of the gradient of a travel road surface and the weight of the vehicle.

The acceleration sensor 8 incorporated in the ECU 6 is a sensor capable of respectively detecting a first acceleration ax in a first direction X and a second acceleration ay in a second direction Y. The first direction X and the second direction Y intersect each other at a predetermined angle, and preferably at a right angle.

In the present embodiment, the acceleration sensor 8 is a single two-axis sensor capable of detecting the first acceleration ax in the first direction X and the second acceleration ay in the second direction Y that intersects the first direction X. Alternatively, the acceleration sensor 8 may be configured as a combination of a sensor capable of detecting the first acceleration ax in the first direction X and a sensor capable of detecting the second acceleration ay in the second direction Y with the relative positional relationship between these sensors fixed.

The ECU 6 with such an acceleration sensor 8 incorporated therein is mounted at a predetermined position of the vehicle 1. Here, the mounting posture of the ECU 6 in the vehicle 1 is set such that one of the first direction X and the second direction Y is the vehicle front-rear direction and the other is the vehicle width direction.

Figure 2A:
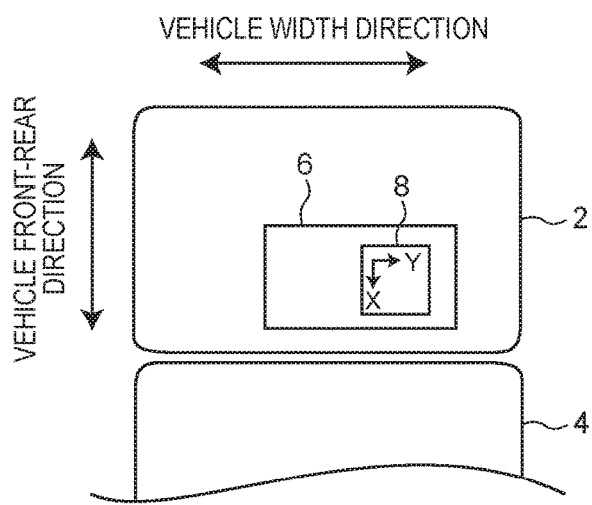
FIGS. 2A and 2B are plan views showing an example of an arrangement of the ECU shown in FIG. 1 as viewed from above the vehicle.
Figure 2B:
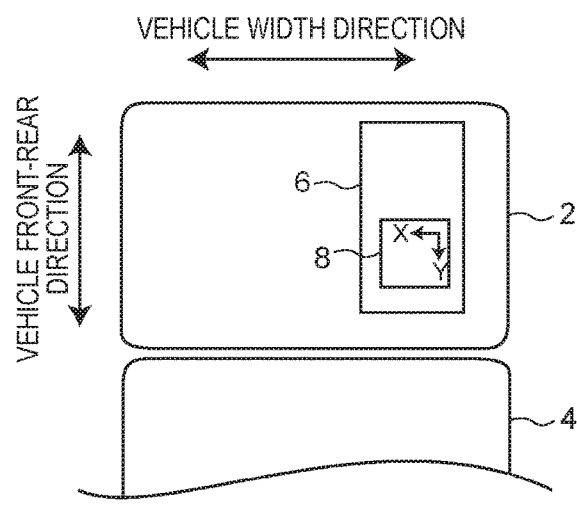

FIGS. 2A and 2B are plan views showing an example of an arrangement of the ECU 6 shown in FIG. 1 as viewed from above the vehicle. FIG. 2A shows a case where the first direction X is set at the vehicle front-rear direction and the second direction Y is set at the vehicle width direction, and FIG. 2B shows a case where the second direction Y is set at the vehicle front-rear direction and the first direction X is set at the vehicle width direction.

With respect to the vehicle 1, selection of one of the mounting postures shown in FIG. 2A and FIG. 2B is determined depending on the specifications of the vehicle 1. In an example of a difference in the specifications of the vehicle 1, the mounting posture may be selected depending on whether the cab 2 is of a full cab type (the cab 2 is designed to be relatively large by providing a space behind the driver's seat and the passenger's seat to allow an occupant to rest while the vehicle is stopped) or a short cab type (the cab 2 is designed to be compact without having a resting space such as that in the full cab type).

In FIG. 2B, the margin of the design layout is small because the size of the cab 2 is smaller than that in FIG. 2A. Thus, the mounting directions of the ECU 6 may differ due to such a difference in specifications of the vehicle 1 as shown in FIG. 2A or FIG. 2B. Consequently, the direction of the acceleration sensor 8 is also changed depending on the mounting posture of the ECU 6 that incorporates therein the acceleration sensor 8. The mounting direction of the ECU 6 incorporating such an acceleration sensor 8 can be determined as follows.

FIG. 3 is a block diagram functionally showing an internal configuration of the ECU 6. FIG. 3 only shows some of functional blocks of the ECU 6, related to the mounting direction determination method according to the embodiment of the present invention.

The ECU 6 includes a storage unit 12 for storing the determination reference data 10, a mounting direction determination unit 14 for determining a mounting direction of the acceleration sensor 8 with respect to the vehicle 1, a learning count unit 16 capable of counting a learning count, and an initial setting unit 18 for performing an initial setting by recording a determination result in a memory (which may be the same as the storage unit 12) incorporated in the ECU 6.

The determination reference data 10 is stored in the storage unit 12. The determination reference data 10 specifies a combination of the detection results acquired by the acceleration sensor 8 and the mounting direction of the acceleration sensor 8 with respect to the vehicle. FIG. 4 shows an example of the determination reference data 10 stored in the storage unit 12 of FIG. 3. In this example, the determination reference data 10 includes combinations of types 1 to 4. Type 1 is a combination of the first acceleration ax which indicates a sign of "positive" during acceleration and a sign of "negative" during deceleration and the second acceleration ay which does not respond during acceleration and deceleration. The type 1 corresponds to the mounting direction of the ECU 6 in which the first direction X is oriented toward the rear side of the vehicle. Type 2 is a combination of the first acceleration ax which indicates a sign of "negative" during acceleration and a sign of "positive" during deceleration and the second acceleration ay which indicates no response during acceleration and deceleration. The type 2 corresponds to the mounting direction of the ECU 6 in which the first direction X is oriented toward the front side of the vehicle. Type 3 is a combination of the second acceleration ay which indicates a sign of "positive" during acceleration and a sign of "negative" during deceleration and the first acceleration ax which indicates no response during acceleration and deceleration. The type 3 corresponds to the mounting direction of the ECU 6 in which the second direction Y is oriented toward the rear side of the vehicle. Type 4 is a combination of the second acceleration ay which indicates a sign of "negative" during acceleration and a sign of "positive" during deceleration and the first acceleration ax which indicates no response during acceleration and deceleration. The type 4 corresponds to the mounting direction of the ECU 6 in which the second direction Y is oriented toward the front side of the vehicle.

Further, the vehicle 1 is provided with an accelerator opening degree sensor 20 capable of detecting an opening degree of an accelerator pedal (not shown), a brake opening degree sensor 22 capable of detecting an opening degree of a brake pedal (not shown), a key sensor 24 capable of detecting ON/OFF of a key of the vehicle 1, and a vehicle speed sensor 26 capable of detecting a speed of the vehicle 1. The detection signals from these respective sensors are fed to the ECU 6 via predetermined signal wires and become usable for various controls.

Figure 5:
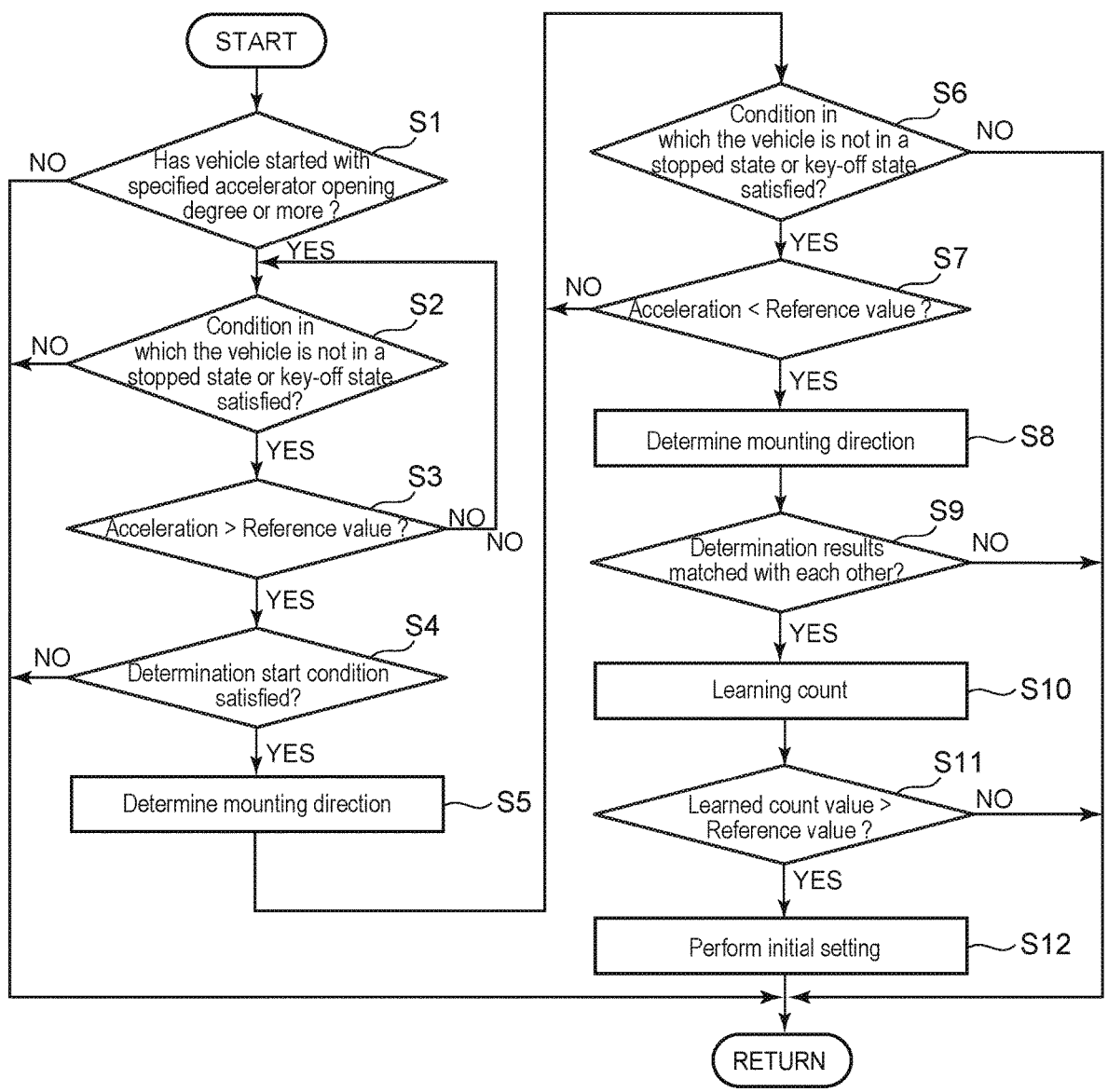
FIG. 5 is a flowchart showing respective steps of a mounting direction determination method of an acceleration sensor according to an embodiment of the present invention.

FIG. 5 is a flowchart showing respective steps of a mounting direction determination method of the acceleration sensor 8 according to the embodiment of the present invention. The mounting direction determination method shown in FIG. 5 is preferably performed by the ECU 6 with the above-mentioned configuration.

First, the ECU 6 determines whether or not the vehicle has started with a specified accelerator opening degree or more (step S1). This determination is made, for example, based on whether or not the detection value of the accelerator opening degree sensor 20 exceeds a predetermined threshold value.

When the condition in step S1 is satisfied, the ECU 6 further determines that the vehicle 1 is not in a stopped state or key-off state (step S2). Specifically, for example, the stopped state is determined based on whether or not the detection value of the vehicle speed sensor 26 is zero, or the key off state is determined based on whether or not the detection value of the key sensor 24 is off.

When the condition in step S2 is satisfied, the ECU 6 determines whether or not an acceleration is larger than a reference value (step S3). This determination is performed using, for example, an acceleration calculated by differentiating the detection value (speed) of the vehicle speed sensor 26 with respect to time to judge whether or not the vehicle 1 is in the acceleration state.

When the condition in step S3 is satisfied, the ECU 6 determines whether or not a determination start condition is satisfied (step S4). The determination start condition is a condition for starting determination of the mounting direction of the acceleration sensor 8. The determination start condition is determined based on, for example, the presence or absence of a response for each of the first acceleration ax and the second acceleration ay, which are detection values of the acceleration sensor 8. In the present embodiment, the determination start condition is determined to be satisfied when only one of the first acceleration ax and the second acceleration ay responds to the acceleration sensor, whereas the determination start condition is determined not to be satisfied when both of the first acceleration ax and the second acceleration ay respond to the acceleration sensor or when both accelerations do not respond to the acceleration sensor.

When the condition in step S4 is satisfied, the mounting direction determination unit 14 determines the mounting direction of the acceleration sensor 8 with respect to the vehicle 1 by comparing the actually measured values of the first acceleration ax and the second acceleration ay acquired by the acceleration sensor 8 with the determination reference data 10 stored in the storage unit 12 (step S5). As mentioned above, since the determination reference data 10 specifies the determination references corresponding to the types 1 to 4 during acceleration, in step S5, it is determined which type the actually measured values of the first acceleration ax and the second acceleration ay by the acceleration sensor 8 are matched with.

Specifically, when the first acceleration ax of the acceleration sensor 8 is "positive" (while the second acceleration ay does not respond), this state corresponds to the type 1 of the determination reference data 10. Thus, it is determined that the mounting direction of the ECU 6 is set such that the first direction X is oriented toward the rear side of the vehicle. When the first acceleration ax of the acceleration sensor 8 is "negative" (while the second acceleration ay does not respond), this state corresponds to the type 2 of the determination reference data 10. Thus, it is determined that the mounting direction of the ECU 6 is set such that the first direction X is oriented toward the front side of the vehicle. When the second acceleration ay of the acceleration sensor 8 is "positive" (while the first acceleration ax does not respond), this state corresponds to the type 3 of the determination reference data 10. Thus, it is determined that the mounting direction of the ECU 6 is set such that the second direction Y is oriented toward the rear side of the vehicle. When the second acceleration ay of the acceleration sensor 8 is "negative" (while the first acceleration ax does not respond), this state corresponds to the type 4 of the determination reference data 10. Thus, it is determined that the mounting direction of the ECU 6 is set such that the second direction Y is oriented toward the front side of the vehicle.

Subsequently, the ECU 6 determines that the vehicle 1 is not in a stopped state or key-off state (step S6). The step S6 is the same as the step S2 described above.

When the condition in step S6 is satisfied, the ECU 6 determines whether or not an acceleration is smaller than the reference value (step S7). This determination is performed using, for example, an acceleration calculated by differentiating the detection value (speed) of the vehicle speed sensor 26 with respect to time to thereby judge whether or not the vehicle 1 is in the deceleration state.

Like the step S5 described above, when the condition in step S7 is satisfied, the mounting direction determination unit 14 determines the mounting direction of the acceleration sensor 8 with respect to the vehicle 1 by comparing the actually measured values of the first acceleration ax and the second acceleration ay acquired by the acceleration sensor 8 with the determination reference data 10 stored in the storage unit 12 (step S8). As mentioned above, since the determination reference data 10 specifies the determination references corresponding to the types 1 to 4 during deceleration, in step S8, it is determined which type the actually measured values of the first acceleration ax and the second acceleration ay acquired by the acceleration sensor 8 are matched with.

Specifically, when the first acceleration ax of the acceleration sensor 8 is "negative" (while the second acceleration ay does not respond), this state corresponds to the type 1 of the determination reference data 10. Thus, it is determined that the mounting direction of the ECU 6 is set such that the first direction X is oriented toward the rear side of the vehicle. When the first acceleration ax of the acceleration sensor 8 is "positive" (while the second acceleration ay does not respond), this state corresponds to the type 2 of the determination reference data 10. Thus, it is determined that the mounting direction of the ECU 6 is set such that the first direction X is oriented toward the front side of the vehicle. When the second acceleration ay of the acceleration sensor 8 is "negative" (while the first acceleration ax does not respond), this state corresponds to the type 3 of the determination reference data 10. Thus, it is determined that the mounting direction of the ECU 6 is set such that the second direction Y is oriented toward the rear side of the vehicle. When the second acceleration ay of the acceleration sensor 8 is "positive" (while the first acceleration ax does not respond), this state corresponds to the type 4 of the determination reference data 10. Thus, it is determined that the mounting direction of the ECU 6 is set such that the second direction Y is oriented toward the front side of the vehicle.

Subsequently, the ECU 6 determines whether the mounting direction determined in step S8 is matched with the mounting direction determined in step S5 (step S9). In this way, the mounting direction can be determined with higher accuracy by determining the mounting direction based on whether or not the determination results under different traveling situations, such as acceleration and deceleration, of the vehicle 1 are matched with each other.

When the condition in step S9 is satisfied, a learning count unit 16 counts up a learned count value (step S10), and determines whether or not the learned count value exceeds a reference value (step S11). When the learned count value exceeds the reference value, the initial setting unit 18 performs an initial setting by recording the determination result in a memory (which may be the same as the storage unit 12) incorporated in the ECU 6 (step S12). As a result of the repetitive determination in this way, when a determination result with sufficient reliability is obtained, this result is judged to be true, and then the initial setting is performed. Thus, the initial setting is performed based on the determination result which has been judged with high accuracy, so that the vehicle to be controlled can have satisfactory reliability.

As described in the above-mentioned embodiments, the mounting direction determination is performed during both acceleration and deceleration. Alternatively, the mounting direction determination may be performed only during either acceleration or deceleration.

It is noted that when the mounting direction determination is performed during both acceleration and deceleration, if the determination result can be obtained in only one of the acceleration and deceleration, or if the learned count value did not satisfy the reference value, the initial setting may be temporarily performed based on the determination result obtained so far. In this case, the initial setting is repeatedly performed as the learning count is repeated, so that the mounting direction can be corrected gradually with higher accuracy.

In the above-mentioned embodiment, the determination start condition is determined to be satisfied in step S4 shown in FIG. 5, when only one of the first acceleration ax and the second acceleration ay responds to the acceleration sensor. Thus, the mounting direction determination can be performed simply with high accuracy based on whether each of the first acceleration ax and the second acceleration ay is determined to be positive or negative. It is noted that even when both the first acceleration ax and the second acceleration ay respond to the acceleration sensor, the mounting direction determination can also be performed based on the similar technical idea, even though the type specified by the determination reference data becomes complicated.

As mentioned above, the aforesaid embodiments can provide the mounting direction determination device and the mounting direction determination method of the acceleration sensor 8 which can automatically determine the direction of the acceleration sensor 8 mounted on the vehicle 1. Thus, an operator does not need to directly make setting related to the mounting direction of the acceleration sensor 8, which surely eliminates the possibility of occurrence of any human error, making it possible to improve the reliability of products employing the mounting direction determination device. Furthermore, the mounting direction determination device and the mounting direction determination method can be applied to mass production and thus expected to increase production efficiency.

At least one embodiment of the present invention can be used in a mounting direction determination apparatus and a mounting direction determination method of an acceleration sensor for determining a mounting direction of an acceleration sensor mounted on a vehicle.

REFERENCE SIGNS LIST

1 Vehicle
2 Cab
4 Deck
8 Acceleration sensor
10 Determination reference data
12 Storage unit
14 Mounting direction determination unit
16 Learning count unit
18 Initial setting unit
20 Accelerator opening degree sensor
22 Brake opening degree sensor
24 Key sensor
26 Vehicle speed sensor

What is claimed is:

1. A mounting direction determination device of an acceleration sensor for determining a mounting direction of the acceleration sensor with respect to a vehicle, the acceleration sensor being capable of respectively detecting a first acceleration in a first direction and a second acceleration in a second direction that intersects the first direction, the mounting direction determination device comprising:
- a storage unit for storing determination reference data that specifies a combination of detection results of the first acceleration and the second acceleration and a mounting direction of the acceleration sensor on the vehicle; and
- a mounting direction determination unit for determining a mounting direction of the acceleration sensor with respect to the vehicle by comparing actually measured values of the first acceleration and the second acceleration detected by the acceleration sensor with the determination reference data stored in the storage unit, wherein
- the acceleration sensor is mounted such that one of the first direction and the second direction is a vehicle front-back direction, while the other of the first direction and the second direction is a vehicle width direction, and
- the mounting direction determination unit determines the mounting direction of the acceleration sensor with respect to the vehicle when only one of the first acceleration and the second acceleration has a non-zero value, whereas the mounting direction determination unit does not determine the mounting direction when both of the first acceleration and the second acceleration have a non-zero value or when both of the first acceleration and the second acceleration have a zero value.

2. The mounting direction determination device of an acceleration sensor according to claim 1, wherein
the mounting direction determination unit determines the mounting direction of the acceleration sensor with respect to the vehicle during acceleration of the vehicle.

3. The mounting direction determination device of an acceleration sensor according to claim 1, wherein
the mounting direction determination unit determines the mounting direction of the acceleration sensor with respect to the vehicle during deceleration of the vehicle.

4. The mounting direction determination device of an acceleration sensor according to claim 1, wherein
the mounting direction determination unit determines whether or not the mounting direction determined during acceleration of the vehicle is matched with the mounting direction determined during deceleration of the vehicle.

5. The mounting direction determination device of an acceleration sensor according to claim 4, further comprising an initial setting unit for performing an initial setting of the acceleration sensor based on the mounting direction, determined by the mounting direction determination unit, wherein
the initial setting unit performs the initial setting based on the mounting direction when the mounting direction determination unit determines that the mounting direction determined during acceleration of the vehicle is matched with the mounting direction determined during deceleration of the vehicle.

6. The mounting direction determination device of an acceleration sensor according to claim 4, wherein
the initial setting unit performs the initial setting based on the mounting direction in a case where the number of times when the mounting direction determination unit determines that the mounting direction determined during acceleration of the vehicle is matched with the mounting direction determined during deceleration of the vehicle exceeds a predetermined value.

7. The mounting direction determination device of an acceleration sensor according to claim 1, wherein
the acceleration sensor is incorporated in a control unit mounted on the vehicle.

8. A mounting direction determination method of an acceleration sensor for determining a mounting direction of the acceleration sensor with respect to a vehicle, the acceleration sensor being capable of respectively detecting a first acceleration in a first direction and a second acceleration in a second direction that intersects the first direction, the method comprising the steps of:
- previously preparing determination reference data that specifies a combination of detection results of the first acceleration and the second acceleration and mounting directions of the acceleration sensor on the vehicle;
- acquiring actually measured values of the first acceleration and the second acceleration detected by the acceleration sensor; and
- determining a mounting direction of the acceleration sensor with respect to the vehicle by comparing the actually measured values of the first acceleration and the second acceleration with the determination reference data, wherein
- the acceleration sensor is mounted such that one of the first direction and the second direction is a vehicle front-back direction, while the other of the first direction and the second direction is a vehicle width direction, and
- the mounting direction of the acceleration sensor with respect to the vehicle is determined when only one of the first acceleration and the second acceleration has a non-zero value, whereas the mounting direction is not determined when both of the first acceleration and the second acceleration have a non-zero value or when both of the first acceleration and the second acceleration have a zero value.

9. The mounting direction determination method of an acceleration sensor according to claim 8, wherein
the step of determining the mounting direction includes the steps of:
determining the mounting direction during acceleration of the vehicle;
determining the mounting direction during deceleration of the vehicle; and
determining whether the mounting direction determined during acceleration is matched with the mounting direction determined during deceleration.

10. The mounting direction determination method of an acceleration sensor according to claim 9, further comprising the step of:
performing the initial setting of the acceleration sensor based on the mounting direction in a case where the number of times when the mounting direction determined during the acceleration is matched with the mounting direction determined during the deceleration exceeds a predetermined value.

* * * * *